UNITED STATES PATENT OFFICE.

TOMENOSUKE MUTO, OF KOBE, JAPAN, ASSIGNOR TO KANEGAFUCHI BOSEKI KABUSHIKI KWAISHA, OF TOKYO-FU, JAPAN.

PROCESS OF PRODUCING AN EXTRACT OF PROTEOLYTIC ENZYMS.

1,296,600. Specification of Letters Patent. Patented Mar. 4, 1919.

No Drawing. Application filed December 14, 1918. Serial No. 266,814.

*To all whom it may concern:*

Be it known that I, TOMENOSUKE MUTO, a subject of the Empire of Japan, residing at 279 Minatomachi 1-chome, Kobe, Japan, have invented a certain new and useful Process of Producing an Extract of Proteolytic Enzyms, of which the following is a specification.

My invention relates to the process of extracting proteolytic enzym from the bodies of silkworms and several other cocoon-forming insects at any stage of their growth, as well as from their secretions and discharges, and has for its object to produce a new sort of proteolytic enzym very easily and economically, and thereby to produce the same practically and usefully for industrial and medical uses.

Silkworms and several other cocoon-forming insects, in their metamorphoses from pupæ into moths, each secretes a certain juice by which a portion of the cocoon is softened and loosened. Considering that this softening and loosening is due, not to a physical action of wetting nor merely to an action of alkaline matter contained in the juice, but mainly to an action of certain ingredients existing in the juice, the inventor has devoted himself to the investigation of said secretion, and has now discovered therein a certain proteolytic enzym which is capable of dissolving albumin especially sericin and thereby loosening fibers of silk. Furthermore, the inventor has invented a process of extracting proteolytic enzym not only from the secreted juice but also from the bodies of silkworms and other cocoon-forming insects at every stage of their growth, as well as from their secretions and discharges, most of which materials were heretofore considered as mere waste.

In carrying the invention into effect, any "cocoon-forming insect material" (the bodies, secretions and discharges of cocoon-forming insects at any desired stage of their growth hereinafter referred to under the general expression "cocoon-forming insect material") containing the enzym in question is digested with water containing a small amount of sodium chlorid at a temperature of 5° to 15° C. for six to forty-eight hours, or at a temperature of 40° C. for five to fifteen minutes; if necessary, suitable antiseptic materials incapable of injuring the enzym may then be added, and then the material squeezed. The extracted liquid, thus obtained, may be put into an evaporator, and then concentrated to about 5% to 10% of its volume, while at a temperature of about 45° C., and then the sediment is removed. In the extraction and concentration of the enzym, it will be obvious that temperatures should be employed which do not injuriously affect the enzym. The temperatures above stated are safe in this respect. Temperatures above 50° C. should be avoided for reasons stated below.

According to the purpose for which the product is to be used, the said product may be then further concentrated to a paste or a solid. Moreover, a purer residue containing the enzym may be produced by the application thereto of an agent capable of precipitating the enzym, such as alcohol, ether, sulfate of ammonia, etc., or by "salting-out."

The product obtained by the above process, contains a large quantity of a certain proteolytic enzym which decomposes several kinds of albumin, especially sericin. Sericin becomes readily dissolved in a short time by the action of this proteolytic enzym. The other valuable properties of this proteolytic enzym are: that it is most active at a temperature of about 40° C.; it is resistant to dry heat for some time, in that it can be subjected, in a dry state, to a temperature of 100° C., retaining its activity to some extent; while in moist heat, its activity is gradually reduced at a temperature of over 50° C., and in moist heat at 80° to 90° C. it loses nearly all of its activity; it is somewhat active in weak acid solution, and is more active in weak alkaline solution, as well as in neutral solutions.

Now, as this extract of proteolytic enzym can dissolve sericin or other proteid bodies in a short time, it may be used effectively in filature, waste silk spinning, and manufacture of floss-silk, to soften or dissolve sericin and to loosen fibers of silk, as well as for finishing of silk threads and silk fabrics. Furthermore, this extract may be applied, like other proteolytic enzym, in medicine, as well as in the preparation of peptone and for other purposes.

Though several other proteolytic enzyms hitherto known may be used for the above mentioned purposes, yet most of them are too expensive to be generally used for industrial purposes. According to the present invention, however, the proteolytic enzym being easily and cheaply produced, it may be provided in abundance at a low price.

The proteolytic enzym as produced herein, and the preparation of this material when using solutions broadly, or when using glycerin-and-water solution as the extractive material, are not claimed herein, but in my copending application Serial Number 164343 filed April 25, 1917.

I claim:

1. A process of producing a proteolytic enzym from cocoon-forming insect material which comprises digesting such material with a solution of sodium chlorid at a temperature not high enough to injure the enzym, separating the liquor from the undissolved matter, and then separating the enzym from the liquor.

2. A process of producing a proteolytic enzym from cocoon-forming insect material which comprises digesting said material with a solution containing sodium chlorid at a temperature below about 50° C., thereafter adding a suitable antiseptic material to the said substance, separating the liquor from the undissolved matter, and then separating the enzym from the liquor.

In testimony whereof I have affixed my signature in presence of two witnesses.

TOMENOSUKE MUTO.

Witnesses:
- KASAKU TAKASHIMA,
- SUEKICHI KIDO.